UNITED STATES PATENT OFFICE.

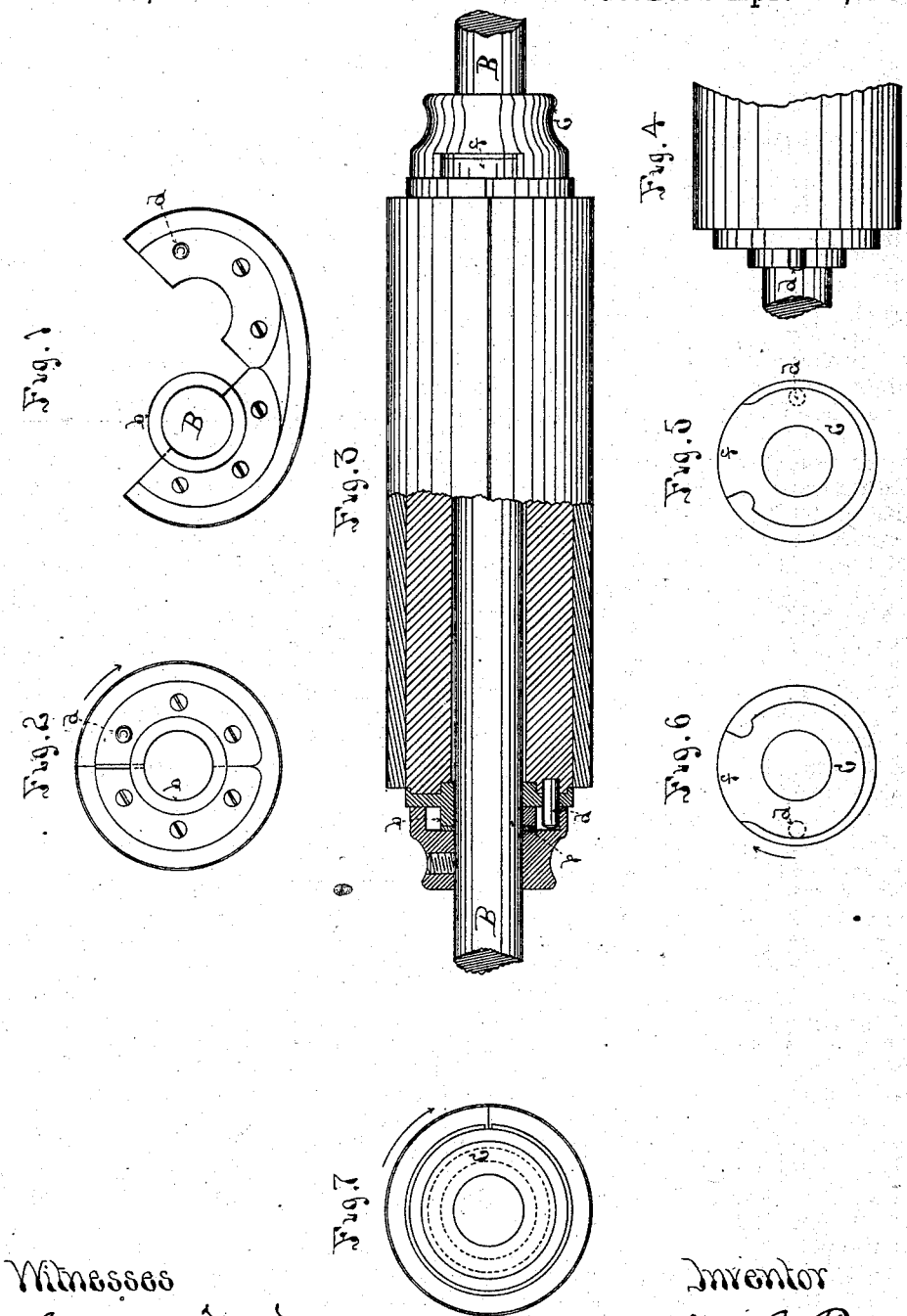

JOHN G. BUZZELL, OF LYNN, MASSACHUSETTS.

BUFFING-ROLL.

SPECIFICATION forming part of Letters Patent No. 315,477, dated April 14, 1885.

Application filed December 10, 1884. (No model.)

*To all whom it may concern:*

Be it known that I, JOHN G. BUZZELL, a citizen of the United States, residing at Lynn, in the county of Essex and State of Massachusetts, have invented a new and useful improvement in buffing-rolls, such as are used in shoe machinery and for other similar purposes, of which the following is a specification.

This invention relates to certain improvements in holding, closing, and fastening the halves or parts of a divided buffing-roll, so that the outer covering of sand-paper may be easily applied, the roll quickly closed, and securely held when the machine is in operation.

The objects of my invention are, first, to attach a divided roll to the shaft, which carries it so loosely as to allow freedom for a partial revolution by hand without moving the shaft, and yet to so hold the roll on the shaft securely and firmly enough to conveniently fasten on the sand-paper; second, to provide for quickly and easily closing the roll and locking the parts together; third, to so lock the roll that its rapid motion, when the machine is in operation, shall bind the parts more tightly together, instead of tending to loosen the roll from its fastenings, as is often the case with the fastenings now in use. I attain these objects by the mechanism illustrated in the accompanying drawings, in which—

Figure 1 represents an end view of a roll opened to receive the sand-paper around its periphery, and showing the pin $d$ and ring $b$. Fig. 2 shows the same closed. Fig. 3 shows the roll in its position on the shaft, with a portion cut away from the roll and one cam, showing the cushion or spring $p$ and the cams which hold the roll at either end. Fig. 4 shows a portion of a roll on a shaft, but without the cam, showing the pin $d$. Figs. 5 and 6 show a section of the cams C C with the right and left openings to receive the pins on the ends of the roll. Fig. 7 is an end view of a roll, cam, and shaft.

Similar letters refer to similar parts throughout the several views.

The buffing-roll is constructed, as usual, of two or more parts hinged together, one of which in my invention is fastened by rings $b\ b$ loosely to the shaft B, by which the roll is revolved, the shaft being a part of a machine driven very rapidly by power. Upon each end of the roll is a pin, $d$, projecting about one-third of an inch. At each end of the roll is fastened firmly to the shaft a cam, C. Within each cam is a spring or cushion of rubber, leather, or other suitable material, $p$, which presses against the end of the roll hard enough to prevent it from turning on the shaft too easily while the sand-paper is being fastened to its surface, but yet allowing the roll to be turned by hand on the shaft when the operator desires to close and lock the roll. In the periphery of each cam is an opening, $f$, just large enough to receive the pins on the ends of the roll when the same is closed, and this opening is carried into the cams on the faces next to the ends of the roll, the openings being formed in both cams in the same direction, like right and left screws. These openings or slots in the cams are in the form of a section of a spiral screw and extend about two-thirds around the cams.

When the sand-paper has been fastened to the roll in the usual manner, the roll is closed and the pins $d\ d$ fall into the openings $f\ f$. The operator then gives the roll a turn on the shaft sufficient to carry the pins into the screw-slots till the roll is locked by the pressure of the pins against the outer side of the slots. This turn of the roll is in the opposite direction from that produced by the shaft when the machine is in operation, so that when the sole of a shoe or other substance to be abraded is applied to the roll the pull of the work has a constant tendency to force the pins farther into the slot and to lock the roll more securely. When the shaft is in motion, the right and left cams C C bind the pins on both ends of the roll alike, holding the roll securely, and doing away with any tendency to become loose, found in the fastenings now in use.

I prefer to fasten the cams to the shaft and to attach the roll loosely; but the same result might be obtained to a less satisfactory degree by the equivalent device of fastening the roll to the shaft and turning up the right and left cams to hold the parts of the roll together, both cams turning in the same direction.

I have found the pins $d\ d$ and openings $f\ f$ a good arrangement for locking the roll; but the same result may be obtained by other mechanism. Another method would be to make the ends of the roll eccentric, so that when the roll or cams are turned on the shaft for the purpose of locking, the eccentric ends of the roll may press against bearings on the cams and fasten the roll more and more tightly.

I do not intend to claim the divided buffing-roll, as that has been patented; but the arrangement by which the frequent changes in sand-paper are easily accomplished, and that by which the roll is securely locked, I do claim as my invention, and desire to secure by Letters Patent, as follows, viz:

1. The combination of the fixed cams C C, the springs or pads $p\ p$, the rings $b\ b$, and the pins $d\ d$ in a buffing-roll, as set forth.

2. The combination of the fixed cams C C with a divided buffing-roll having the pins $d\ d$, or their equivalent, for closing the same, substantially as set forth.

3. In combination with a buffing-roll having a pin, $d$, at each end, the right and left cams C C, constructed substantially as herein described.

4. The combination of the divided buffing-roll secured to the shaft, having the pins $d\ d$, or their equivalent, for closing the same, with the right and left cams C C, loose upon the shaft, substantially as set forth.

JOHN G. BUZZELL.

Witnesses:
GEORGE F. TUCKER,
CHAS. ALLEN TABER.